US012115776B2

(12) United States Patent
Llorach To et al.

(10) Patent No.: US 12,115,776 B2
(45) Date of Patent: Oct. 15, 2024

(54) PRINTING SYSTEM HAVING A SAFETY ASSEMBLY WITH A ROLLING ELEMENT

(71) Applicant: Hewlett-Packard Development Company, L.P., Spring, TX (US)

(72) Inventors: Marcel Llorach To, Sant Cugat del Valles (ES); Eduardo Martin Orue, Sant Cugat del Valles (ES); Ricardo Sanchis Estruch, Sant Cugat del Valles (ES); Fernando Rey Arrieta, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 114 days.

(21) Appl. No.: 17/995,578

(22) PCT Filed: Apr. 6, 2020

(86) PCT No.: PCT/US2020/026945
§ 371 (c)(1),
(2) Date: Oct. 5, 2022

(87) PCT Pub. No.: WO2021/206685
PCT Pub. Date: Oct. 14, 2021

(65) Prior Publication Data

US 2023/0321998 A1 Oct. 12, 2023

(51) Int. Cl.
*B41J 11/00* (2006.01)
*B41J 11/06* (2006.01)

(52) U.S. Cl.
CPC .......... *B41J 11/005* (2013.01); *B41J 11/0085* (2013.01); *B41J 11/0095* (2013.01); *B41J 11/06* (2013.01)

(58) Field of Classification Search
CPC ... B41J 11/005; B41J 11/0085; B41J 11/0095; B41J 11/06
See application file for complete search history.

(56) References Cited

U.S. PATENT DOCUMENTS

| | | | | |
|---|---|---|---|---|
| 5,594,486 | A | 1/1997 | Kiyohara | |
| 5,673,074 | A * | 9/1997 | Miyauchi | B41J 13/14 400/645 |
| 5,897,259 | A | 4/1999 | Ahn | |
| 6,409,332 | B1 | 6/2002 | Yraceburu et al. | |
| 6,702,493 | B2 | 3/2004 | Sole et al. | |
| 6,758,546 | B2 | 7/2004 | Hinojosa et al. | |
| 6,848,765 | B1 | 2/2005 | Cleveland | |
| 8,882,261 | B2 | 11/2014 | Spence et al. | |
| 10,308,041 | B2 | 6/2019 | Washizawa | |

(Continued)

FOREIGN PATENT DOCUMENTS

| | | | |
|---|---|---|---|
| CN | 102991149 | A | 3/2013 |
| CN | 103707663 | A | 4/2014 |

(Continued)

*Primary Examiner* — Henok D Legesse
(74) *Attorney, Agent, or Firm* — Jordan IP Law, LLC

(57) ABSTRACT

Examples relate to printing systems comprising a safety assembly associated with a printhead. The safety assembly comprises a rolling element upstream of the printhead in the print medium advance direction to prevent a print medium from contacting the printhead.

15 Claims, 5 Drawing Sheets

(56) References Cited

U.S. PATENT DOCUMENTS

| | | | | |
|---|---|---|---|---|
| 2003/0038420 | A1* | 2/2003 | Cleary | B65H 11/005 271/197 |
| 2003/0043248 | A1 | 3/2003 | Samoto et al. | |
| 2003/0197772 | A1 | 10/2003 | Watsuki et al. | |
| 2005/0276645 | A1 | 12/2005 | Hirte et al. | |
| 2006/0012658 | A1 | 1/2006 | Samoto et al. | |
| 2007/0200907 | A1 | 8/2007 | Kuki et al. | |
| 2012/0218360 | A1* | 8/2012 | Sugitani | B41J 11/005 347/104 |
| 2014/0098153 | A1 | 4/2014 | Moore et al. | |
| 2015/0116395 | A1 | 4/2015 | Schelmbauer | |

FOREIGN PATENT DOCUMENTS

| | | | |
|---|---|---|---|
| JP | 2006-176271 | A | 7/2006 |
| JP | 2020-032567 | A | 3/2020 |
| KR | 10-1998-0017379 | A | 6/1998 |
| WO | 2019/089023 | A1 | 5/2019 |

* cited by examiner

PRINTING SYSTEM HAVING A SAFETY ASSEMBLY WITH A ROLLING ELEMENT

BACKGROUND

A printing system may include a pen or a printhead with a plurality of nozzles that deliver print agent onto a print medium so as to print an image. In printing processes, a distance between the printhead and the print medium, known as the printhead-to-print medium spacing (also known as pen-to-paper spacing, PPS), may influence print quality.

BRIEF DESCRIPTION OF THE DRAWINGS

Various example features will be apparent from the detailed description which follows, taken in conjunction with the accompanying drawings, wherein.

DETAILED DESCRIPTION

A printing system comprises a printhead which may deliver print agent onto a print medium, e.g. a paper sheet. The printhead may be provided with a plurality of nozzles to deliver print agent, e.g. ink, onto the print medium so as to print an image. During printing, dots of print agent may be precisely delivered onto the print medium at a specific printhead-to-print medium spacing or distance. Increasing the printhead-to-print medium spacing (PPS) may reduce the precision of the position of the print agent dots. Consequently, print quality may be reduced. Decreasing the printhead-to-print medium spacing (PPS) may increase the probabilities of crashes between the print medium and the printhead.

Printing systems may comprise print medium advance systems, e.g. hold down systems and/or print medium feed mechanisms, to transport a print medium. These print medium advance systems may additionally flatten the print medium.

In some examples, print media may comprise unflattened regions such as bent or bowed edges, warpages or wrinkles. In some examples, a print medium may bend or buckle upwardly towards the printhead and may unintentionally contact the printhead. Such a contact may damage the printhead.

Figure 1:
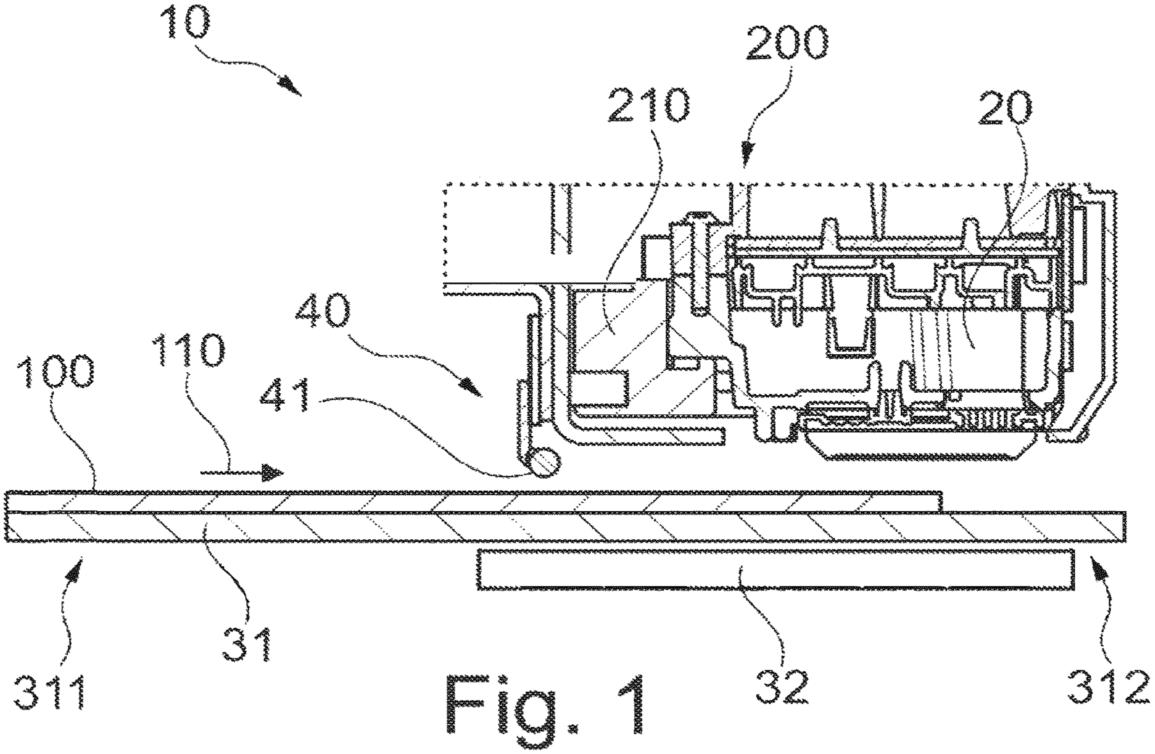
FIG. 1 illustrates a cross-sectional view of a printing system according to an example of the present disclosure.

FIG. 1 illustrates a cross-sectional view of a printing system according to an example of the present disclosure. The printing system 10 comprises a printhead 20 to deliver a print agent on a print medium 100, a print platen surface 31 to support the print medium 100 advancing in a print medium advance direction 110 and a hold down system 32 to hold down the print medium 100 on the print platen surface 31. The printing system 10 further comprises a safety assembly 40 associated with the printhead 20. The safety assembly 40 comprises a rolling element 41 upstream of the printhead 20 in the print medium advance direction 110 to prevent the print medium 100 from contacting the printhead 20.

The safety assembly 40 may prevent the print medium 100 from contacting the printhead 20 when the print medium 100 bends upwards towards the printhead 20. As the safety assembly 40 is upstream of the printhead 20 in the print medium advance direction 110, the rolling element 41 may contact a portion of the print medium bending upwards before reaching the printhead position. The rolling element 41 may force the upwards portion of the print medium to bend downwards. Damages caused on the printhead 20 by an undesirable contact with the print medium 100 may thus be reduced. In addition, a predetermined printhead-to-print medium spacing (PPS) may be maintained. The print agent may thus be delivered at a predetermined position or distance with respect to the print medium. Quality and reliability of the printing process may thus be improved.

The print platen surface 31 supports the print medium 100 to receive the print agent delivered by the printhead 20. The printhead is above the print platen surface and a print zone may be defined therebetween. The print platen surface may guide and support the print medium in the print zone during printing. A lower side of the print medium may lie on the print platen surface.

The print medium is a material capable of receiving print agent, e.g. ink. The print medium may comprise paper, cardboard, cardstock, textile material or plastic material. The print medium may be a sheet, e.g. a sheet of paper or a sheet of cardboard.

The print medium may comprise a substantially planar substrate to receive print agent delivered by the printhead. The print medium may extend from a leading edge to a trailing edge in the print medium advance direction along a width. In some examples, the print medium may comprise an average thickness greater than 2 mm. In some examples, the average thickness of the print medium may be between 2 mm and 15 mm.

A print medium having a thickness greater than 2 mm may involve a relatively high structural rigidity which may imply greater forces to flatten the print medium. Print media having an average thickness between 2 mm and 15 mm may be called rigid print media. Manufacturing a rigid print medium may generate a curvature on the print medium in a direction between the leading edge and the trailing edge. This curvature may cause the trailing edge and the leading edge of the print medium to bend upwards.

The hold down system 32 may apply a holding force on the print medium 100 to hold down the print medium 100 on the print platen surface 31. The hold down system may thus help to flatten the print medium when passes over the print zone. In some examples, hold down system may comprise a vacuum assembly to apply vacuum under the print platen surface for flattening the print medium onto the print platen surface. The print platen surface may be permeable, so as to allow the vacuum through the print platen surface to pull the print medium against the print platen surface. For example, the print platen surface may comprise a plurality of through-holes in fluid communication with a vacuum source. The vacuum assembly may suck the print medium towards the print platen surface.

In some examples, a holding force applied on the print medium by the hold down system may be lower than a force for flattening the print medium. For example, the holding force applied by the hold down system may be lower than a force for flattening the upwards edges of a rigid print medium, e.g. a print medium with an average thickness between 2 mm and 15 mm. Accordingly, in some examples, the print medium may comprise unflattened or lifted regions, e.g. bent or bowed edges. In some examples, the upwards edges of a rigid print medium, e.g. the leading edge, may remain lifted when the print medium advances towards the print zone. Accordingly, a leading edge of a rigid print medium may remain upwards and may impact against the printhead. Thicker print media may increase a risk of failure of the printhead in case of a crash.

In these examples, the rolling element may contact an upwards region of the print medium, e.g. a leading edge of a print medium with an average thickness between 2 and 15 mm, when a height of this upwards region is greater than a height between the rolling element and the print platen surface. The rolling element may guide the upwards region, e.g. an upwards leading edge, towards the print platen surface. The rolling element may apply a force against the upwards region, e.g. the leading edge, greater than a force for flattening a given print medium. The rolling element may thus counteract a rigidity of the print medium and the flatness of the print medium in the print zone may be improved. The rolling element may thus flatten the print medium downstream of the rolling element. The safety assembly may thus prevent the print medium from contacting the printhead when the hold down system is not capable of maintaining the print medium, e.g. a leading edge of the print medium, on the print platen surface. Accordingly, printing defects may be reduced.

The print platen surface of this figure extends from an upstream region 311 to a downstream region 312. In FIG. 1, the printhead 20 is above the downstream region 312 of the print platen surface 31. In some examples, the printhead may be above a central region of the print platen surface, e.g. between the upstream region 311 and the downstream region 312 of the print platen surface 31.

In some examples, the printing system may comprise a print medium feed mechanism for feeding print medium to a print zone. The print medium feed mechanism may make the print medium advance in the print medium advance direction. The print medium feed mechanism may be away from the printhead. In some examples, the print medium feed mechanism may be adjacent to the upstream region of the print platen surface. For example, the print medium feed mechanism may be prior of the upstream region of the print platen surface in the print medium advance direction.

The print medium feed mechanism may comprise a drive roller engaging the print medium. The print medium feed mechanism may further comprise a pinch wheel or roller above the drive roller in contact with print medium. The print medium may be gripped between the drive roller and the pinch wheel. The driver roller may rotate causing the print medium to advance in the print medium advance direction. As the pinch roller is in contact with the print medium, moving the print medium in the print medium advance direction may cause the rotation of the pinch roller.

In some examples, the printing system may comprise a print medium advance system comprising a print platen surface, a hold down system and a print medium feed mechanism according to any of the examples herein disclosed.

The safety assembly 40 of this figure is associated with the printhead 20. In this disclosure, a safety assembly associated with a printhead means that a height of the safety assembly with respect to the print platen surface is related to a height of the printhead. A difference between the height of the safety assembly and the height of the printhead with respect to the print platen surface is maintained substantially constant during printing.

In this disclosure, a height means a distance in a direction perpendicular to the print platen surface or in a direction perpendicular to the print medium. Therefore, during printing, a height of a component of a printing system may substantially correspond to a vertical direction.

In some examples, a safety assembly associated with a printhead may comprise connecting the safety assembly to the printhead. In some examples, a safety assembly associated with a printhead may comprise connecting the safety assembly with a print bar which may support a printhead The printing system of FIG. 1 comprises a printhead which may deliver print agent onto a print medium advancing along a print medium advance direction. The printhead may be provided with a plurality of nozzles to deliver print agent, e.g. ink, onto the print medium to form an image. In this disclosure, depositing print agent on a print medium includes firing, ejecting, spitting or otherwise delivering print agent onto the print medium. The printhead may comprise a print agent chamber containing print agent to be delivered onto the print medium.

In some examples, a heating element may cause a rapid vaporization of print agent in a print agent chamber, increasing an internal pressure inside this print agent chamber. This increase in pressure makes a drop of print agent exit from the print agent chamber to the print medium through a nozzle. These printing systems may be called as thermal inkjet printing systems.

In some examples, a piezo electric may be used to force a drop of print agent to be delivered from a print agent chamber onto the print medium through a nozzle. A voltage may be applied to the piezo electric, which may change its shape. This change of shape may force a drop of print agent to exit through the nozzle. These printing systems may be called as piezo electric printing systems.

In some examples, the printhead may be static. The printhead or a plurality of printheads may extend along a width of a print medium, i.e. in a print medium width direction. The plurality of nozzles may be distributed within the printhead or a plurality of printheads along the width of the print medium. The width of the print medium extends in a print medium width direction. The print medium width direction may be substantially perpendicular to the print medium advance direction. Such an arrangement may allow most of the width of the print medium to be printed simultaneously. These printing systems may be called as page-wide array (PWA) printing systems.

The printing system of FIG. 1 is a page-wide array printing system. The printhead 20 or a plurality of printheads may statically span substantially the whole width of print medium along the print medium width direction. In some examples, printheads may be provided in printhead modules comprising several printheads.

In FIG. 1 the printing system 10 comprises a print bar 200 spanning a width of the print medium 100 along the print medium width direction. The printhead 20 of this figure is mounted on the print bar 200. In this figure the print bar 200 comprise a print bar structure 210 spanning a width of the print medium 100 in the print medium width direction. The printhead 20 may be connected to the print bar structure 210. In some examples a plurality of printheads may be mounted on the print bar to cover the width of the print medium. For example, a plurality of printhead modules may be mounted on the print bar.

The safety assembly 40 may be connected to the print bar 200. In this figure, the safety assembly 40 is connected to the print bar structure 210. The safety assembly 40 of this figure is thus connected to the printhead 20 through the print bar structure 210. Consequently, the safety assembly 40 is associated with the printhead 20.

In some examples, the safety assembly may be connected to the printhead or to a printhead module. For example, the safety assembly may be screwed to the printhead.

In some examples, the printhead may travel repeatedly across a scan axis for delivering print agent onto a print medium which may advance along a print medium advance direction. The scan axis may be substantially perpendicular to the print medium advance direction. The scan axis may be substantially parallel to print medium width direction. A printhead height, i.e. a distance between the printhead and the print platen surface, may thus be maintained substantially constant when the print medium travels across the scan axis. The printhead may be mounted on a carriage for moving across the scan axis. In some examples, several printheads may be mounted on a carriage. In some examples, four printheads may be mounted on a single carriage. In some examples, eight printheads may be mounted on a single carriage.

Printing systems having a printhead travelling across a scan axis may comprise a fixed structure spanning a width of a print medium along the scan axis which is parallel to the print medium width direction. The fixed structure may be mounted at a height with respect to print platen surface and may extend along a direction parallel to the print medium width direction. The printhead may thus slide along the fixed structure in a direction parallel the print medium width direction. The fixed structure may comprise a beam extending between lateral sides of the printing system.

A safety assembly may be connected to the fixed structure of a scan axis printing system. A difference between the height of the rolling element and the height of the printhead may be maintained substantially constant. Accordingly, a safety assembly may be associated with a scan axis printhead.

In some examples, the rolling element may continuously contact the print medium. Flattening the print medium may be enhanced. Consequently, a predetermined printhead-to-print medium may be precisely maintained.

In some examples, the rolling element may occasionally contact the print medium, e.g. when the upwards regions of the print medium are greater than a predetermined height. Marks on the print medium may thus be reduced. A print medium contacting the rolling element may induce a rotation of the rolling element. In some examples, the safety assembly may comprise a plurality of rolling elements. In some examples, the roller element may be a roller to rotate about an axis parallel to a print medium width direction. An upwards region of the print medium may contact the roller and may induce the roller to rotate. The roller may be a cylinder. In some examples, the roller element may be a sphere that may rotate after contacting an upward region of the print medium.

In some examples, the rolling element may rotate about a spindle extending in a print medium width direction. For example, when the rolling element comprises a sphere, the spindle may extend through a diameter of the sphere.

In some examples, the printing system may comprise a sensor 50 to sense a force exerted by the print medium against the rolling element when the rolling element contacts the print medium. The sensor 50 may thus detect if a force exerted by the print medium against the rolling element is greater than a predetermined force. In some examples, the sensor 50 may be an optical sensor. In some examples, the sensor 50 may be a contact sensor.

Greater contacting forces may imply higher upwards regions of the print medium upstream of the rolling element. For example, a leading edge of the print medium may crash against an upper half part of the rolling element. In some examples, a force exerted by the leading edge of the print medium contacting an upper half part of the rolling element may be greater than the predetermined force. In some examples, a leading edge of the print medium may crash against a lower half part of the rolling element exerting a force greater than a predetermined force. The sensor system may send a safety signal if a force greater than the predetermined is detected.

In some examples, the sensor system may comprise a detector to detect a movement or a deflection of a component of the safety assembly. The detector may detect a change of a height of the rolling element. For example, the detector may detect a deflection of a spindle supporting the rolling element of the safety assembly. In some examples, the detector may directly measure a deflection of the spindle. In some examples, the detector may detect a movement of a component, e.g. a bar or an encoder, connected to the spindle. In some examples, the detector may be contacted by the spindle or by an element connected to the spindle after deflecting.

The printing system may comprise a controller. The controller may receive a safety signal if the sensor system detects a force greater than the predetermined force. The controller may further stop the operation of the printing system if a safety signal is received. For example, the controller may prevent the print medium from advancing. The protection of the printhead may thus be improved.

In some examples, a printing system may comprise a plurality of safety assemblies. The safety assemblies may be distributed along a print medium width direction.

Figure 2:
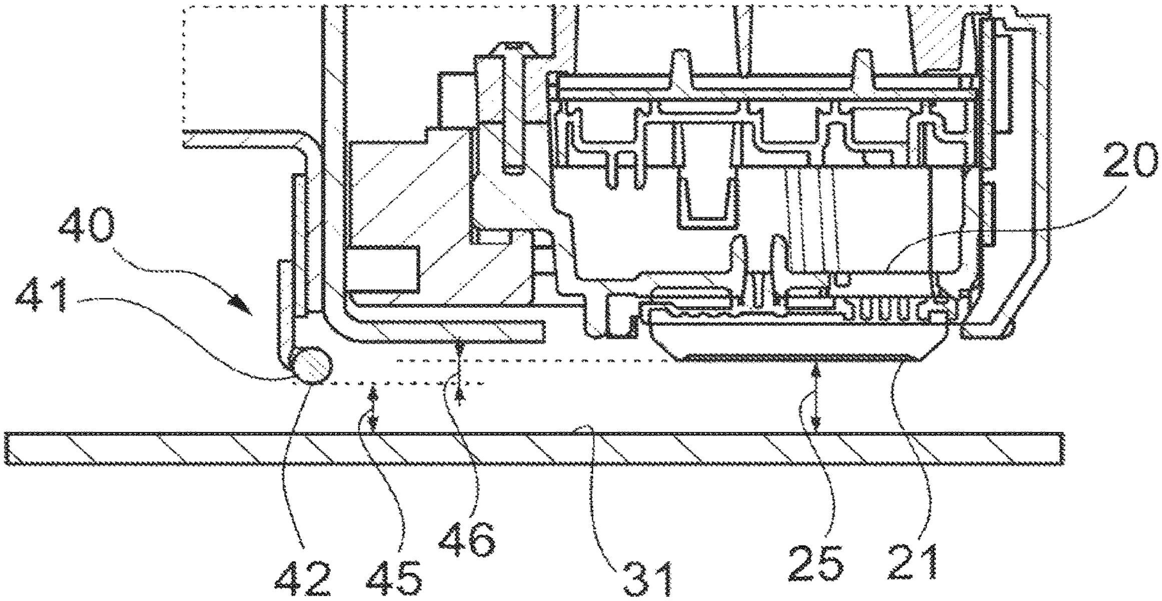
FIG. 2 schematically illustrates a zoom-in view of a part of the printing system of FIG. 1.

FIG. 2 schematically illustrates a zoom-in view of a part of the printing system of FIG. 1. Heights, distances and/or dimensions of FIG. 2 are not in scale. The printhead 20 of this figure comprises a printhead lower portion 21. During printing, the printhead lower portion 21 faces the print medium (not illustrated in FIG. 2). The printhead lower portion 21 of this figure is the portion of the printhead 20 closest to the print platen surface 31. i.e. the lowest portion of the printhead 21. A distance 25 between the printhead lower portion 31 and the print platen surface 31 defines a height of the printhead. In this disclosure, height of the printhead 25, printhead height 25, height of the printhead lower portion 25 and distance 25 between the printhead lower portion and the print platen surface are used interchangeable to denote the minimum distance between any portion of the printhead 20 and the print platen surface 31. In some examples, the printhead lower portion 21 may correspond to a printhead die.

The rolling element 41 of FIG. 2 comprises a rolling element lower portion 42 facing the print medium (not shown in FIG. 2) and the print platen surface 31. The rolling element lower portion 42 is a point, a line or a surface of the rolling element 41 closest to the print platen surface 31.

Accordingly, a distance 45 between the rolling element lower portion 42 and the print platen surface 31 may thus be defined. In this disclosure, height 45 of the rolling element, rolling element height 45, height of the rolling element lower portion 45 and distance 45 between the rolling element lower portion and the print platen surface are used to denote the minimum distance between any point of the rolling element 41 and the print platen surface 31.

A tangential line or a tangential surface from the rolling element lower portion 42 may be parallel to the print medium advance direction and/or to the print platen surface 31. A distance 45 between the rolling element lower surface 42 and the print platen surface 31 may be independent from the rotation of the rolling element. For example, the rolling element 41 may comprise a cylinder rotatably about a rotation axis perpendicular to the print medium advance direction. The rolling element lower portion 42 of the cylinder may be the lowest line or surface of the cylinder when the cylinder rotates.

The rolling element lower portion 42 may extend a length 46 from the printhead lower portion 21 in a direction towards the print medium. The printhead height 25 may thus be the sum of the rolling element height 45 and the length 46.

In some examples, the length 46 extending between the print height 25 and the rolling element height 45 may be greater than 0.2 mm. An upwards region of the print medium may occasionally contact the rolling element of the safety assembly to flatten or direct this upwards region towards the print platen surface. The printhead may thus be protected against crashes. Furthermore, an optimum printhead-to-print medium spacing (PPS) may be maintained. In some examples, the length 46 may be between 0.2 mm and 1.5 mm. In some examples, the length 46 may be between 0.2 mm and 1 mm.

In some examples, the rolling element height 45, i.e. a height of rolling lower portion 42 from the print platen surface 31, may greater than 0.3 mm plus a thickness of the print medium. Accordingly, there may be a gap or a distance between the rolling element lower portion 42 and a flatten print medium greater than 0.3 mm. This gap may be defined as a rolling element-to-print medium spacing. This may prevent the print medium from being continuously contacted by the rolling elements. Marks on the print medium may thus be reduced.

For example, for a given print medium having a thickness of 5 mm, the rolling element height 45 may be greater than 5.3 mm. Accordingly, upwards regions of a print medium with a height greater than 5.3 mm may contact the rolling element. Then, the rolling element may reduce the height of this upwards regions. Crashes of the print medium with the printhead may thus be prevented.

In this disclosure, a print medium height may be defined as a distance between the uppermost regions of the print medium and the print platen surface. The print medium height may be equal to the thickness of the print medium (when the print medium is flat) or greater than the thickness of the print medium (when the print medium comprises unflattened regions).

In some examples, the rolling element height 45 may between 1.5 mm and 0.3 mm plus a thickness of the print medium. For example, the rolling element height 45 may be 0.5 mm plus a thickness of the print medium. In this example, a gap or a distance between the rolling element lower portion 42 and a flatten print medium may be 0.5 mm, i.e. the rolling element height. Following with this example, if the thickness of the print medium is 8 mm, then, the rolling element height 45 is 8.5 mm.

In some examples, the rolling element height 45 may be between 0 mm and 1.5 mm. For example, the rolling element height may be 0 mm. The rolling element height may thus correspond with the thickness of the print media. The rolling element may thus continuously contact the print medium. Flattening the print medium may be enhanced. Consequently, a predetermined printhead-to-print medium may be precisely maintained.

In some examples, the rolling element height 45 may be adjusted as a function of the thickness of the print medium. For example, the rolling element height 45 may be adjusted to set a distance between the rolling element lower portion 42 and the print platen surface 31 greater than a 0.3 mm plus the thickness of the print medium. In some examples, the rolling element height may be adjusted to continuously contact the print medium. Accordingly, the safety assembly may be adjusted for several the print medium thicknesses. The printing system may thus be compatible with several print media.

Figure 3A:
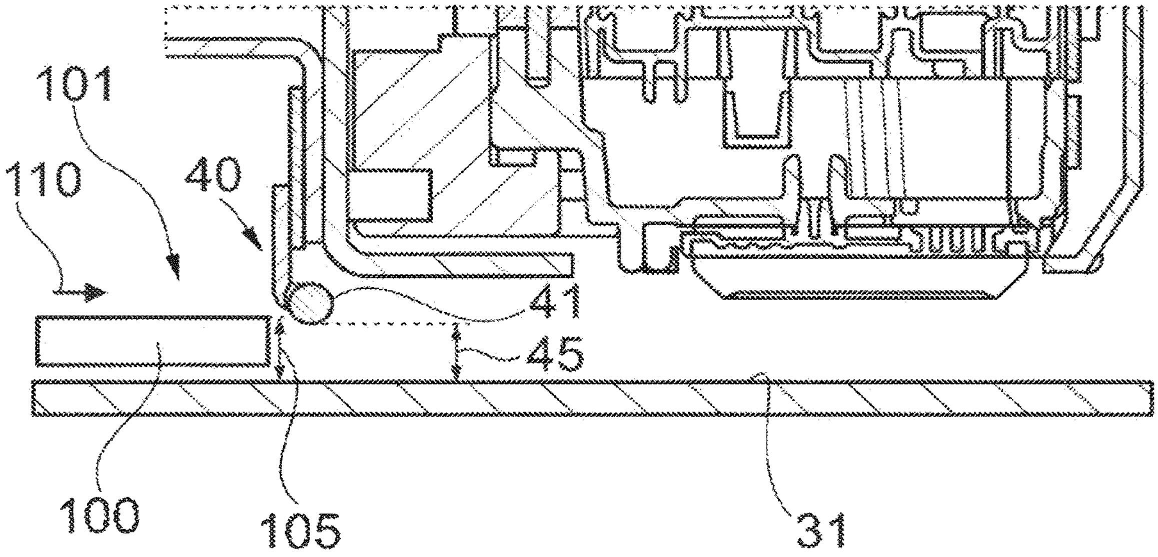
FIGS. 3*a* and 3*b* respectively illustrate an upwards region of a print medium before and after being contacted by a rolling element of a safety assembly according to an example of the present disclosure.
Figure 3B:
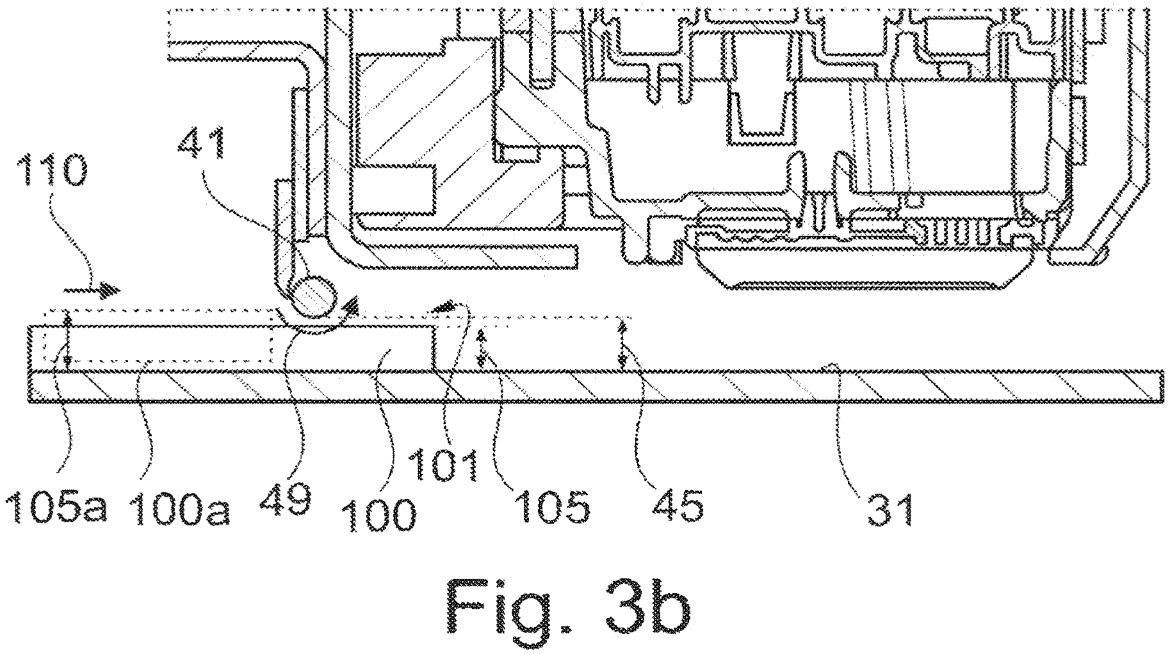

FIGS. 3*a* and 3*b* respectively illustrate an upwards region of a print medium before and after being contacted by a rolling element of a safety assembly according to an example of the present disclosure. Heights, distances and/or dimensions of FIGS. 3*a* and 3*b* are not in scale. In these figures, the safety assembly 40 comprises a rolling element 41 at a height 45.

In FIGS. 3*a* and 3*b*, a print medium 100 is advancing in a print medium advance direction 110. The print medium 100 of these figures comprises a leading edge 101.

In FIG. 3*a*, the leading edge 101 of the print medium comprises an upwards region having a print medium height 105 greater than the thickness of the print medium. Throughout this region, the print medium 100 does not contact the print platen surface 31. The leading edge 101 of the print medium 100 of FIG. 3*a* is unflattened, i.e. the leading edge bends upwards.

In FIG. 3*a*, the print medium height 105 is greater than the rolling element height 45, so as the print medium will contact the rolling element when continues advancing in the print medium advance direction.

FIG. 3*b* schematically represents the print medium 100 after being contacted by the rolling element 41. An advance of the print medium of FIG. 3*a* (represented with dotted lines referenced as 100*a* in FIG. 3*b*) in the print medium advance direction 110 makes the rolling element 41 rotate in a counterclockwise rotation 49 after being contacted by the leading edge 101. The rolling element may lower the leading edge 101 of the print medium 100. The rolling element may thus pull the print medium 100 against the print platen surface 31.

In FIG. 3*b*, a print medium height 105 after being contacted by the rolling element 41 is lower than the print medium height 105*a* before being contacted by the rolling element (corresponding the print medium of FIG. 3*a*). The action of the rolling element 41 of this figure flattens the print medium 100, so that the print medium height 105 is lower than the rolling element height 45. Accordingly, the print medium height 105 is lower than a printhead height. In addition, the print medium is pulled against the print platen surface 31. The rolling element may thus collaborate to hold down the print medium on the print platen surface. The rolling element may thus help a hold down system to pull the print medium against the print platen surface.

Figure 4:
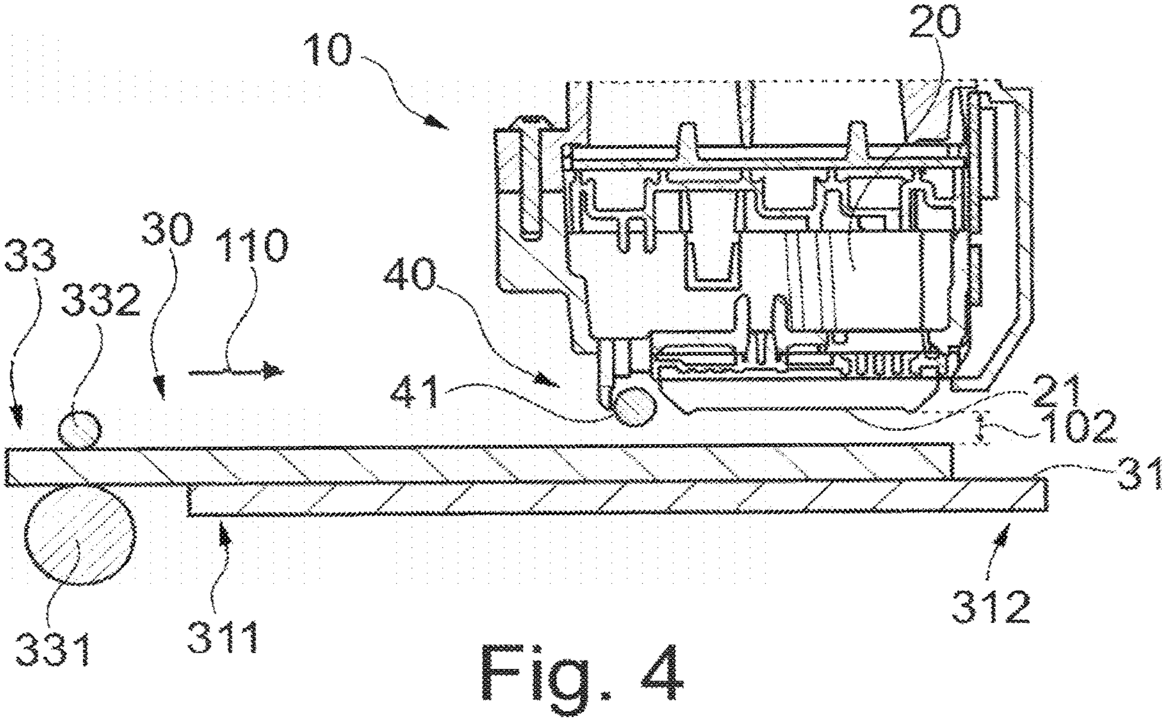
FIG. 4 illustrates a cross-sectional view of a printing system according to an example of the present disclosure.

FIG. 4 illustrates a cross-sectional view of a printing system according to an example of the present disclosure.

The printing system 10 comprises a print medium advance system 30 to transport the print medium 100 in a print medium advance direction 110. The print medium advance system 30 comprises a print platen surface 31 to support the print medium 100. The printing system 10 further comprises a printhead 20 to deliver print agent on the print medium 100 supported by the print platen surface 31, wherein the printhead comprises a printhead lower portion 21 to face the print medium. In addition, the printing system 10 comprises a safety assembly 40 having a rolling element 41 above the print platen surface 31 to maintain a distance 102 between a leading edge 101 of the print medium and the printhead lower portion 21, i.e. a printhead to-print medium spacing (PPS), greater than a predetermined safety distance.

In this figure, the printhead height is higher than the rolling element height. A printhead-to-print medium spacing (PPS) 102 greater than a predetermined safety distance may thus be maintained. Quality and reliability of the printing process may be improved. In addition, the leading edge of the print medium is prevented from crashing against the printhead.

In some examples, the predetermined distance may be 1.3 mm. Consequently, a printhead-to-print medium spacing (PPS) greater than 1.3 mm may be maintained. For example, the printhead-to-print medium spacing (PPS) may be about 1.5 mm.

The predetermined safety distance may be set as a function of the type and/or thickness of the print medium. The print medium may be according to any of the examples herein disclosed. For example, the print medium may comprise a thickness between 2 mm and 15 mm.

For example, for a given PPS about 1.5 mm and a given thickness of 5 mm of the leading edge of the print medium, the printhead height may be about 6.5 mm.

The safety assembly of FIG. 4 may be according to any of the examples herein disclosed. The printing system may comprise a plurality of safety assemblies.

In the example of this figure, the print medium advance system 30 comprises a print medium feed mechanism 33 for feeding print medium to a print zone. In this example, the print medium feed mechanism 33 is upstream of an upstream region 311 of the print platen surface 31 and the printhead 20 is above a downstream region 312 of the print platen surface 31. The print medium feed mechanism 33 may thus be away from the printhead 20.

The print medium feed mechanism 33 of this figure comprises a drive roller 331 and a pinch roller 332 above the drive roller 331. The print medium may be continuously gripped between the drive roller 331 and the pinch roller 332. The rotation of the drive roller 331 makes the print medium advance towards the print zone.

In some examples, the print medium advance system may comprise a hold down system according to any of the examples herein disclosed.

In FIG. 4, the safety assembly 40 is directly connected to the printhead 20. Accordingly, the safety assembly may be closer to the printhead 20. Precision of the printhead-to-print medium spacing (PPS) may thus be improved.

In some examples, the safety assembly 40 may be connected to a print bar structure extending along print medium width direction. The print bar structure may be connected to the printhead.

The printhead of FIG. 4 may be according to any of the examples herein disclosed. In some examples, the printing system may comprise a plurality of printheads.

The printing system of FIG. 4 is a page-wide array printing system. The printing system may comprise a plurality of printheads. The printhead or the plurality of printheads may span the whole width of the print medium.

The printing system may comprise a sensor system to detect a force exerted by the leading edge of the print medium against the rolling element greater than a predetermined force. Safety of the printhead may thus be improved.

In some examples, the sensor may be according to any of the examples herein disclosed. For example, the rolling element may be mounted about a spindle extending in a print medium width direction and the sensor may comprise a detector to detect a deflection of the spindle. A force exerted by the leading edge of the print medium greater than a predetermined may thus be detected.

The printing system may comprise a controller according to any of the examples herein disclosed. In some examples, the controller may control the operation of the printing system. In some examples, the controller may be a dedicated controller. The controller may receive a safety signal if the sensor system detects a force greater than the predetermined force and may stop the print medium advance system if the controller receives the safety signal. For example, the controller may send a signal to the print medium advance system to stop the movement of the print medium advancing towards the printhead.

Figure 5A:
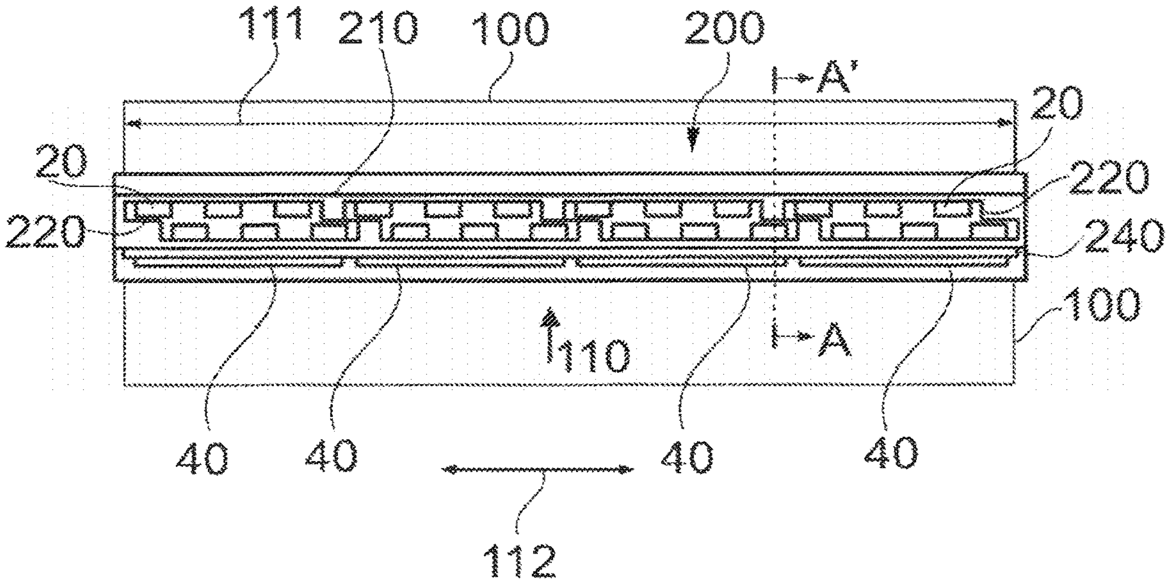
FIGS. 5*a* and 5*b* respectively illustrate a top view of print bar for a page-wide array printing system and a cross-sectional view along A-A' according to an example of the present disclosure.
Figure 5B:
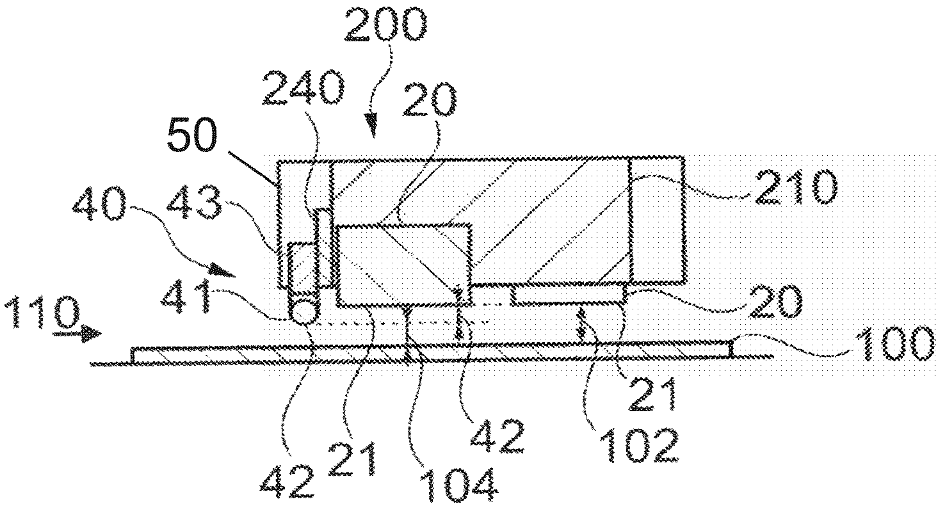

FIGS. 5*a* and 5*b* respectively illustrate a top view of print bar for a page-wide array printing system and a cross-sectional view along A-A' according to an example of the present disclosure. The print bar 200 comprises a printhead 20 having a plurality of nozzles to deliver a print agent on a print medium 100. The printhead 20 comprises a printhead lower portion 21 to face the print medium 100. The print bar 200 comprises a print bar structure 210 spanning a width 111 of the print medium 100. The print bar structure 210 supports the printhead 20. The print bar 200 further comprises a safety assembly 40 comprising a rolling element 41 upstream of the printhead 40 in a print medium advance direction 110 to prevent the print medium 100 from contacting the printhead 40. The rolling element 41 comprises a rolling element lower portion 42 to face the print medium 100. The rolling element lower portion 42 extends a length 42 in a direction perpendicular to the print medium advance direction 110, so that a distance 102 between the printhead lower portion and the print medium is greater than a distance 104 between the rolling element lower portion and the print medium.

When the print bar 200 is mounted in a printing system, the printhead-to-print medium spacing (PPS) 102 is greater than the rolling element-to-print medium spacing 104. Accordingly, a printhead height is greater than a rolling element height. The safety assembly 40 may thus prevent the print medium from contacting the printhead 20.

The print bar 200 of these figures may be mounted in a page-wide array printing system according to any of the examples herein disclosed.

The print bar may extend substantially the whole width 111 of the print medium in the print medium width direction 112. A printhead or a plurality of printheads may statically span substantially the whole width 111 of the print medium.

In these figures, the print bar 200 comprises a plurality of printhead modules 220. The printhead modules 220 may comprise a plurality of printheads 20. The printheads may comprise a plurality of nozzles (not illustrated in these figures) to deliver a print agent to the print medium. The Printheads of these figures may be according to any of the examples herein disclosed.

In these figures, the printhead modules 220 are connected to the print bar structure 210. For example, the printhead modules may be fitted in receivers formed in the print bar structure. In some examples, the printheads may be directly connected to the print bar structure.

The print bar of these figures comprises a connecting structure 240 adjustably connected to the print bar structure 210. A safety assembly 40 may be connected to the connecting structure 240, so that the length 42 between the rolling element lower portion 42 and the printhead lower portion 21 in the direction perpendicular to the print medium advance direction 100 is adjustable. The height of the rolling element may thus be adjusted.

In these figures, a plurality of safety assemblies 40 is connected to the connecting structure 240. Accordingly, the height of the plurality of the safety assemblies may be precisely adjusted. Mounting tolerances may thus be reduced.

The safety assemblies 40 of these figures comprise a bracket. The bracket or brackets 43 may be connected to the connecting structure 240. The rolling element 41 is rotatably mounted about the bracket 43. For example, the rolling element may be supported by a spindle rotatably connected to the bracket. The rolling element 41 may thus rotate about the bracket 43. The spindle may extend in a direction parallel to the print medium width direction 112.

In some examples, the safety assembly may be adjustably connected to the printhead, so that the length between the rolling element lower portion and the printhead lower portion in the direction perpendicular to the print medium advance direction may be adjustable. A bracket of the safety assembly may be fastened to the printhead and/or to the printhead modules.

Figure 6:
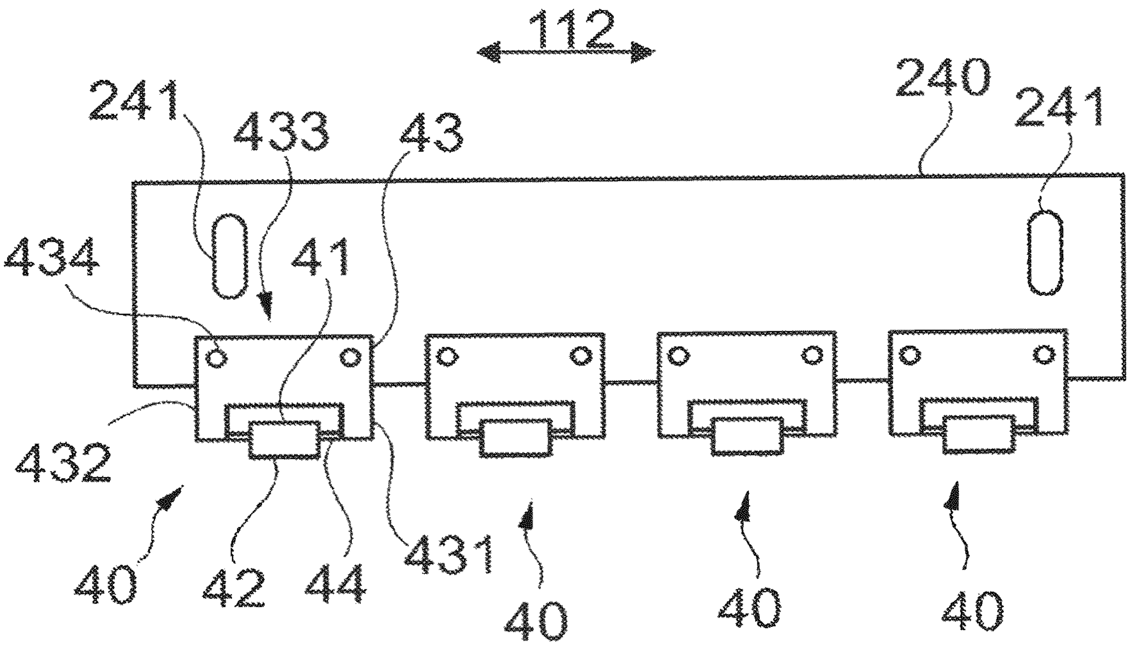
FIG. 6 schematically illustrates a plurality of safety assemblies according to an example of the present disclosure.

FIG. 6 schematically illustrates a plurality of safety assemblies according to an example of the present disclosure. In this figure, four safety assemblies 40 are connected to a connecting structure 240. The connecting structure 240 may be to connect to a print bar structure or to a printhead according to any of the examples herein disclosed.

The safety assemblies of this figure may be mounted in any of the printing systems and/or on the print bars herein disclosed. The safety assemblies 40 of this figure comprises a rolling element 41 mounted on a spindle 44. The rolling element 41 of this figure is a cylinder extending in a direction parallel to the print medium width direction 112. The roller or cylinder may rotate about a direction parallel to print medium width direction 112.

The rolling element 41 comprises a rolling element lower portion 42 as described with respect to other examples of the present disclosure.

In some examples, a plurality of rolling elements may be mounted on a spindle. For example, two or three rolling elements may be mounted on a spindle.

In some examples, the rolling element, e.g. a roller, may comprise a material having a high stiffness and a low friction coefficient. One example of a material with a high stiffness and a low friction coefficient may be polyoxymethylene (POM), also known as acetal, polyacetal and polyformaldehyde. The rolling element may made from an injection-molded polyoxymethylene. A low friction material may reduce marks on the print medium when the print medium contacts the rolling element.

In this figure, the roller 41 comprises a through hole and the spindle 44 is inserted in this through hole. The spindle may engage the through hole of the roller. Accordingly, the roller and the spindle may rotate together. The spindle may extend in a direction parallel to the print medium width direction 112. In some examples, the spindle may comprise steel. The spindle may deflect or bend if a print medium contacts the rolling element, e.g. roller. The spindle may thus act as spring-like element. Such a deflection may be used to determine a force of the print medium against the rolling element.

In some examples, the roller may extend between 15 mm and 30 mm. The roller may comprise a diameter between 3 mm and 10 mm. The spindle may extend between 40 mm and 100 mm. The spindle may comprise a diameter between 0.5 mm and 2.5 mm.

The safety assemblies of this figure comprise a bracket 43 having a first leg 431 and a second leg 432. A central portion 433 connects the first leg 431 to the second leg 432. A first end of the spindle may be rotatably connected to the first leg 431 and a second end of the spindle may be rotatably connected to the second leg 432. In this figure, the central portion 433 comprises holes through which fasteners 434 may be inserted to connect the bracket to the connecting structure 240. The connecting structure may comprise a plurality of holes to receive the fasteners 434 inserted in the holes of the brackets.

In FIG. 6, the plurality of brackets 43 is connected at a predetermined position of the connecting structure 240. Distance between each of the rolling elements and the connecting structure 240 may be substantially constant along the print medium width direction 112.

The connecting structure 240 of this figure comprise a plurality, e.g. two, elongated holes or slots 241. A fastener may be inserted in an elongated hole to fasten the connecting structure to a component of the printing system, e.g. a print bar structure or printhead or a printhead module. The height of the connecting structure may thus be adjusted with respect to the printhead height. In this way, the rolling height may be adjusted for a given thickness of a print medium.

In some examples, the brackets may be fastened to a printhead and/or to a printhead module. In these examples, the bracket may comprise elongated holes or slots to adjust the height of the bracket with respect to the printhead height.

Figure 7:
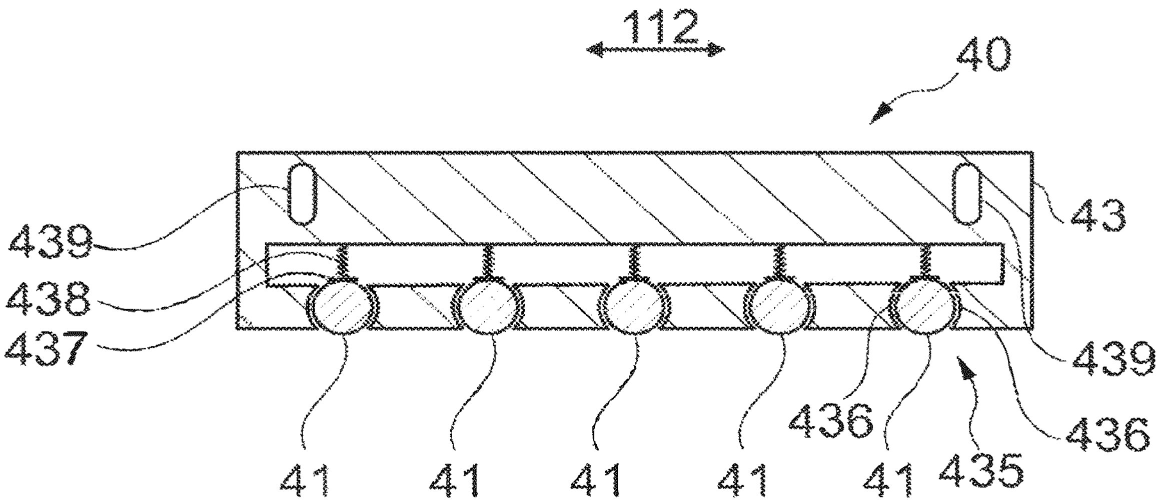
FIG. 7 schematically illustrates a cross-sectional view of a safety assembly according to an example of the present disclosure.

FIG. 7 schematically illustrates a cross-sectional view of a safety assembly according to an example of the present disclosure. The safety assembly comprises a plurality of rolling elements 41 along a print medium width direction 112.

The rolling elements 41 of this figure are spheres. The spheres may comprise a material having a high stiffness and a low friction coefficient. The spheres may comprise polyoxymethylene.

The rolling elements 41 of this figure are partially fitted in holes 435 of a bracket 43. The bracket 43 may comprise supporting surfaces 436 around the holes 435 facing the rolling elements 41. The hole may comprise a variable diameter along its height to substantially correspond to a partial shape of the spheres. In this example, the lower diameter of the hole is smaller than a diameter of the sphere so as to prevent the spheres from falling. The spheres may be partially embedded between two opposite supporting surfaces 436 in such a way that the spheres may rotate inside the holes. The bracket 43 may thus support the rolling elements 41.

In FIG. 7, the safety assembly 40 comprises cup-shaped members 437 engaging a shape of an upper portion of the spheres. The cup-shaped members 437 are connected to the bracket 43 through spring-like elements 438. A force applied on a rolling element 41 may compress the spring-like element 438.

When the safety assembly is mounted in a printing system, a print medium may contact the rolling element. This may generate a compression of the spring-like element.

In some examples, the compression of the spring-like element may be used by a sensor system to determine the force applied on the rolling element.

The bracket 43 of FIG. 7 comprises a pair of elongated holes 439 to adjustably connect the safety assembly 40 to a print bar structure or to a printhead. A height with respect to the print medium may thus be adjusted.

In some examples, the bracket may be connected to print bar structure through a connecting structure. The connecting structure may be adjustable connected to the print bar.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any.

The invention claimed is:

1. A printing system comprising:
- a printhead to deliver a print agent on a print medium;
- a print platen surface to support a print medium advancing in a print medium advance direction;
- a hold down system to hold down the print medium on the print platen surface; and
- a safety assembly associated with the printhead, the safety assembly comprising a rolling element upstream of the printhead in the print medium advance direction and configured to contact the print medium to prevent the print medium from contacting the printhead.

2. The printing system according to claim 1, wherein the rolling element comprises a rolling element lower portion to face the print medium and the printhead comprises a printhead lower portion to face the print medium; and wherein the rolling element lower portion extends a length between 0.2 mm and 1 mm from the printhead lower portion in a direction towards the print medium.

3. The printing system according to claim 2, wherein a height of the rolling element lower portion from the print platen surface is between 0 mm and 1.5 mm plus a thickness of the print medium.

4. The printing system according to claim 1, further comprising a print bar spanning a width of the print medium, wherein the printhead is mounted on the print bar.

5. The printing system according to claim 4, wherein the safety assembly is connected to the print bar.

6. The printing system according to claim 4, wherein the safety assembly is connected to the printhead.

7. A print bar for a page-wide array printing system comprising:
- a printhead having a plurality of nozzles to deliver a print agent on a print medium, wherein the printhead comprises a printhead lower portion to face the print medium;
- a print bar structure spanning a width of the print medium, the print bar structure supporting the printhead; and
- a safety assembly comprising a rolling element upstream of the printhead in a print medium advance direction and configured to contact the print medium to prevent the print medium from contacting the printhead, wherein the rolling element comprises:
  - a rolling element lower portion to face the print medium; and
  - the rolling element lower portion extending a length from the printhead lower portion in a direction perpendicular to the print medium advance direction.

8. The print bar according to claim 7, wherein the safety assembly comprises:
- a bracket;
- a spindle supporting the rolling element, the spindle having two ends rotatably connected to the bracket.

9. The print bar according to claim 8, wherein the safety assembly is adjustably connected to the printhead, so that the length between the rolling element lower portion and the printhead lower portion in the direction perpendicular to the print medium advance direction is adjustable.

10. The print bar according to claim 7, further comprising a connecting structure adjustably connected to the print bar structure, and wherein the safety assembly is connected to the connecting structure and a height of the rolling element is adjustable, so that the length between the rolling element lower portion and the printhead lower portion in the direction perpendicular to the print medium advance direction is adjustable.

11. A printing system comprising:
- a print medium advance system to transport the print medium in a print medium advance direction; the print medium advance system comprising a print platen surface to support the print medium;
- a printhead to deliver a print agent on the print medium supported by the print platen surface; the printhead comprising a printhead lower portion to face the print medium; and
- a safety assembly having a rolling element above the print platen surface configured to contact the print medium to maintain a distance between a leading edge of the print medium and the printhead lower portion greater than a predetermined safety distance.

12. The printing system according to claim 11, wherein the predetermined safety distance is 1.3 mm.

13. The printing system according to claim 11, wherein the printing system comprises a sensor connected to the rolling element to detect a force exerted by the leading edge of the print medium against the rolling element greater than a predetermined force.

14. The printing system according to claim 13, wherein the safety assembly comprises a spindle extending in a print medium width direction, the rolling element mounted about the spindle, and wherein the sensor detects a deflection of the spindle.

15. The printing system according to claim 13, wherein the printing system comprises a controller:
- to receive a safety signal if the sensor detects a force greater than the predetermined force; and
- to stop the print medium advance system if the controller receives the safety signal.

* * * * *